(12) United States Patent
Fabbro et al.

(10) Patent No.: US 7,918,110 B2
(45) Date of Patent: Apr. 5, 2011

(54) WASHING MACHINE COMPRISING A FUEL CELL AND A HYDROGEN GENERATING REACTOR

(75) Inventors: Edi Fabbro, Bertiolo (IT); Valentine Fedorovich Zharov, Saint Petersburg (RU); Alexander Vadimovich Korotynsky, Gatchina (RU)

(73) Assignee: Electrolux Home Products Corporation N.V., Zaventem (BE)

( * ) Notice: Subject to any disclaimer, the term of this patent is extended or adjusted under 35 U.S.C. 154(b) by 684 days.

(21) Appl. No.: 11/916,465

(22) PCT Filed: Jun. 3, 2006

(86) PCT No.: PCT/EP2006/005338
§ 371 (c)(1), (2), (4) Date: Dec. 4, 2007

(87) PCT Pub. No.: WO2006/131284
PCT Pub. Date: Dec. 14, 2006

(65) Prior Publication Data
US 2008/0202174 A1    Aug. 28, 2008

(30) Foreign Application Priority Data
Jun. 8, 2005   (EP) .................................... 05105004

(51) Int. Cl.
*D06F 39/00* (2006.01)
*D06F 39/04* (2006.01)
(52) U.S. Cl. ............................................. 68/15; 68/212
(58) Field of Classification Search ................... 68/3 R, 68/212, 15
See application file for complete search history.

(56) References Cited

U.S. PATENT DOCUMENTS

| 3,133,837 A | 5/1964 | Eidensohn |
| 4,513,065 A | 4/1985 | Adlhart et al. |
| 5,494,538 A | 2/1996 | Kirillov et al. |

(Continued)

FOREIGN PATENT DOCUMENTS

DE         29803525         7/1999

(Continued)

OTHER PUBLICATIONS

International Search Report of PCT/EP2006/005338, 3 pages.

*Primary Examiner* — Joseph L Perrin
(74) *Attorney, Agent, or Firm* — Pearne & Gordon LLP

(57) ABSTRACT

A machine for washing items of various kinds includes a washing tub for containing the washing liquor, and a reactor for generating heat for heating up the washing liquor and a stream of gaseous hydrogen supplying a fuel cell to generate a source of electric power. In the interior thereof, the reactor contains a mass of metals, which may include magnesium, and produces a stream of gaseous hydrogen. The machine further includes a source of water that is let into the reactor to trigger the reaction process producing the hydrogen, a fuel cell that receives the stream of hydrogen and converts it into electric power, an electric connection adapted to transfer the electric power generated by the fuel cell to a controller and an actuator include in the machine, and heat transferring device for transferring the heat generated by the reactor to the washing liquor. In the interior thereof, the reactor includes a first heat exchanger for transferring the heat being generated therein to the washing liquor contained in the washing tub of the machine.

16 Claims, 5 Drawing Sheets

U.S. PATENT DOCUMENTS

| | | | |
|---|---|---|---|
| 5,833,934 A | 11/1998 | Adlhart et al. | |
| 7,168,273 B2 * | 1/2007 | Neergaard et al. | 68/17 R |
| 2002/0000066 A1 | 1/2002 | Bentley et al. | |
| 2002/0112479 A1 * | 8/2002 | Keefer et al. | 60/651 |
| 2004/0088796 A1 * | 5/2004 | Neergaard et al. | 8/158 |
| 2006/0021642 A1 * | 2/2006 | Sliwa et al. | 134/184 |
| 2006/0157094 A1 * | 7/2006 | Zeile | 134/123 |

FOREIGN PATENT DOCUMENTS

| | | |
|---|---|---|
| GB | 1496941 | 1/1978 |
| JP | 2001143737 | 3/2001 |
| JP | 2003221201 | 8/2003 |
| JP | 2004347288 | 12/2003 |
| KR | 2002056131 | 7/2002 |

* cited by examiner

WASHING MACHINE COMPRISING A FUEL CELL AND A HYDROGEN GENERATING REACTOR

The present invention refers to an improved kind of washing machine, preferably a clothes washing machine, or a dishwashing machine, which is adapted to substantially operate without any need for it to be energized from the power-supply line.

While reference will be made to a household-type clothes washing machine throughout the following description, the present invention shall be understood as equally applying to any kind of machine that—for it to operate—requires a considerable amount of heat to heat up a washing or process liquor, as well as an even low-voltage power. In this sense, it shall therefore be understood as effectively and advantageously applying to, say, dishwashing machines.

Generally known everywhere in the art is a pressing need for the usage of electric energy taken from the power-supply line to be reduced and kept as low as possible. Equally well known are the efforts being made by home appliance manufacturers in general to provide appliances that use ever decreasing amounts of energy to operate. This general trend is widely acknowledged and accepted throughout the industry nowadays, so that no need arises here to dwell upon it any further.

Widely acknowledged—in particular by those who have to develop and design appliances for washing purposes in households—are also the problems of both a technical and—above all—an economic nature associated with producing, on an industrial scale, appliances that use energizing voltage from the regular power-supply line for operation, while complying with all of the most stringent safety standard regulations currently applying to such appliances and machines; such constraint, in fact, makes it necessary for the same appliances to be designed and manufactured in a way that forcedly includes a number of construction complications—and related, even quite considerable surcharges in manufacturing costs, of course—basically in view of just complying with the whole set of currently applying safety regulations.

It should furthermore be duly kept in mind that most of the really considerable amount of electric power required by these appliances is mainly used to perform what—for electric power—is certainly a most elementary, basic duty, i.e. heating. Even this circumstance contributes to make washing machines particularly demanding and expensive from an energy usage viewpoint.

Duly considered shall finally be the fact that the high power requirements of washing machines in general to perform their washing cycles make practically these machines fully dependent on the availability of a power-supply mains, since it is not realistic for the time being to think of the possibility for different, alternative—more economic or practical and, in general, more expedient and convenient—power-supply sources to be available for use to such purposes.

The result of such state of things is that, in fact, no significant developments have been made hitherto in view of ensuring the availability of household washing machines that are really capable of working even in the absence of a regular power-supply line and, therefore, of being used in remote, isolated locations, such as for instance a far-out house on the mountains or in a small island, a medium-to-small size boat or, more generally, anywhere a power-supply line is not available or economically unsustainable.

More recently, technical development work has been specially directed at providing more economic, cost-effective and, above all, autonomous energy and power-supply forms that make use of the so-called fuel cells, i.e. cells that are capable of producing electric power through the sole use of hydrogen in the gaseous form to be combined with atmospheric oxygen for reaction therewith.

A most interesting solution in this connection is disclosed in the patent publication KR 1020020056131 A to LG ELECTRONICS INC.

As disclosed in the above-cited patent, use is made in this case of a fuel reformer to produce an amount of gaseous hydrogen $H_2$ that is then delivered to a fuel cell of a type inherently known as such in the art.

The fuel reformer is fed from a fuel supply source, and the reaction of this fuel with the air oxygen in said fuel reformer is a kind of powerful exothermic reaction; the heat produced by such reaction is then captured and transferred—either directly or via appropriate heat-exchangers—to the washing liquor in the washing machine, which is therefore heated up in much the same way as it would be heated up conventionally by an electric heating element energized from a power-supply line and submerged in the same liquor.

Therefore, the disclosed solution appears to be a particularly interesting one, since it suggests that totally autonomous means be provided and used, which are adapted not only to produce—in a simple and, at the same time, even cost-effective manner—a considerable amount of heat, but also ensure a certain generation of electric power, through the use of an inherently known fuel cell that uses the so produced hydrogen and can be kept operating to produce voltage at a low and, thus, non-dangerous level, which may further be advantageously used to only operate the most valuable and demanding functions, for which there is no alternative option to the use of electric power, thereby avoiding using it to heat up water.

The above-described solution has however a quite serious drawback that jeopardizes the possibility for it to be used in a really practical and effective manner. This drawback actually derives from the fuel used to feed the fuel reformer, a fuel that can be both gaseous and liquid and contained in appropriate vessels.

Now, the presence of fuel needed to supply and operate the fuel reformer constitutes a throughout obvious cause of danger, especially in the case that the fuel reformer is used in households, where no adequate skills and abilities generally exist in handling and dealing with anyway quite dangerous liquid or gaseous fuels.

In addition, even the provision, i.e. construction of a fuel reformer is quite expensive and demanding, and its operation must furthermore be constantly and most carefully surveyed and monitored, and this most obviously thwarts a good deal of the advantages offered by the above-cited invention.

The fact must further be considered that a fuel reformer is in any case a piece of equipment that—although miniaturized to a greatest possible extent—keeps anyway implying a quite significant size that might turn out as being inconsistent, i.e. incompatible with an expected use in conjunction with a normal home appliance.

It would therefore be desirable, and it is actually a main object of the present invention, to provide a machine for washing a variety of different items, which is not dependent on an external source of electric power to both energize the various operating parts of the same machine and convert said electric power into heat to be used to heat up the washing liquor used to wash said items in a conventional manner.

Another purpose of the present invention, within said main object thereof, is to provide a machine of the above-cited kind, which is easily manufactured using readily available, existing techniques, and is further competitive in its construction and convenient and easy to use and operate.

According to the present invention, these aims are reached in a particular kind of washing machine that is provided with operating and control means as described below by way of non-limiting example with reference to the accompanying drawings, in which.

Figure 1:
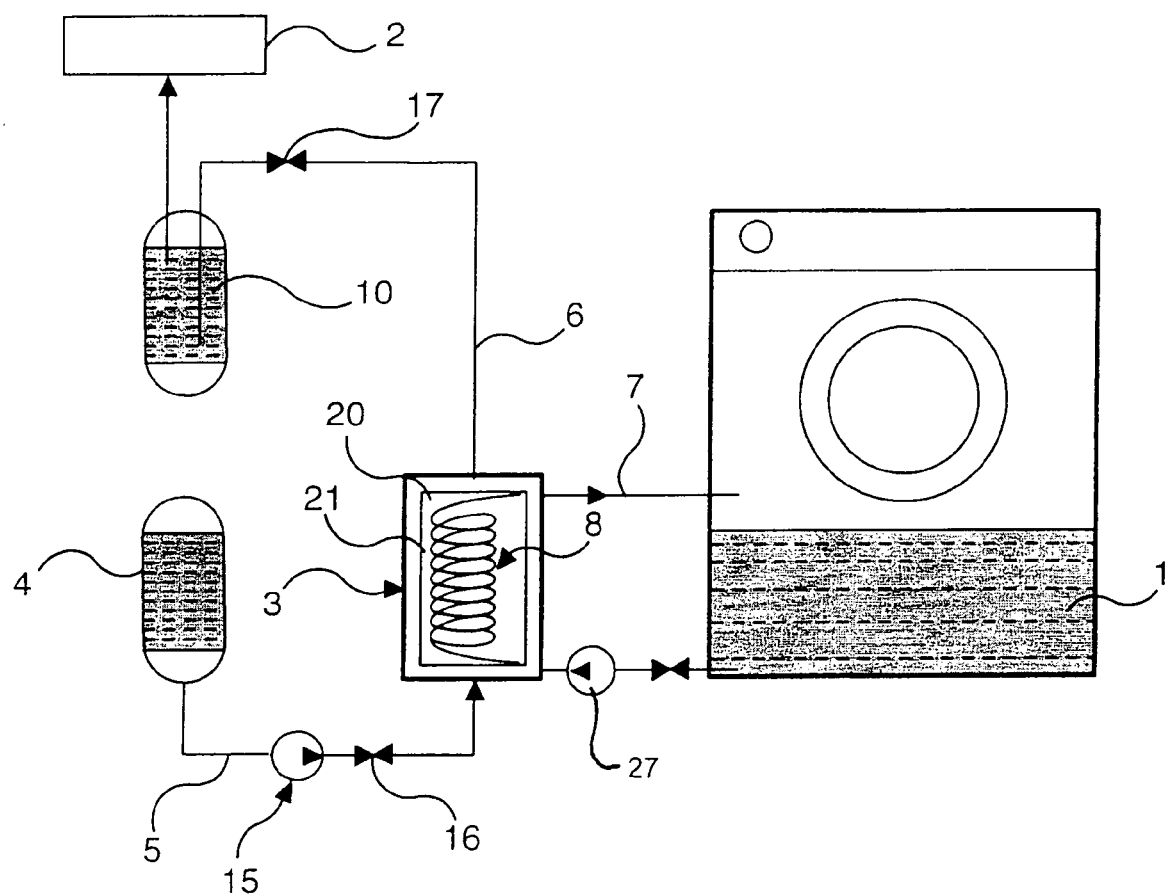
FIG. 1 is a general schematic view of the basic construction of a washing machine according to the present invention.

The basic purpose of the present invention lies in the use of a single device, i.e. the reactor, to generate both a flow of gaseous hydrogen aimed at supplying the fuel cell, which in turn generates the required electric power, and the heat needed to heat up the washing liquor, i.e. to perform a duty that is generally known as being quite expensive in terms of energy usage.

A clothes washing machine according to the present invention comprises a tub or outer drum 1 containing the washing liquor and further accommodating in a conventional manner a rotating drum (not shown) adapted to hold the items to be washed, i.e. the washload.

Said washing machine further comprises:
- a fuel cell 2 adapted to receive a flow of gaseous hydrogen and convert it into electric power through a proper energy generation process; this fuel cell is a device of a type generally known as such in the art that can be either specifically made using readily available techniques and parts or appropriately selected for use among the wide variety of types and versions available on the marketplace.

The electric power generated by this process is conveyed to the control and actuation means of the machine—and, anyway to all those devices of the machine that use power for operation—via conventional connections and linking means. Typical examples of these power-using devices of a machine are the relays, the pumps, the motor used to drive the rotating drum, the electromagnetic valves, the indicator lamps and similar display means, the pressure switches, the thermostats or temperature control switches, and, more generally, all those electronic controls that require a power supply.

The generation of said flow of gaseous hydrogen is brought about by following means:
- a sealed reactor 3,
- a water source or reservoir 4,
- a first conduit 5 to convey the water from said source or reservoir 4 to said reactor 3,
- a second conduit 6 to convey a flow of gaseous hydrogen from said sealed reactor to said fuel cell,
- a third conduit 7 to convey a flow of water from said reactor to said washing liquor,
- first heat-exchanger means 8 between said third conduit 7 and said reactor.

As far as the construction and the operation of the sealed reactor 3—which is the actual core of the present invention—is concerned, some basic information is given below, along with technical data and specifications which, although generally known on a scientific level, are used to advantage in a fully innovative and original manner in view of achieving the aims of the present invention.

Hydrogen Production from Water Decomposition with the Use of Activated Metals and Alloys.

Hydrogen can be released from water as caused by the effect of a variety of metals.

Alkaline and alkaline-earth metals (except calcium) react more actively with water under hydrogen emission. Here, the reaction occurs at the room temperature. Such metals as calcium, magnesium, aluminum, manganese (in powder), rare-earth metals react with water heated to 50-100° C.

Aluminum interacts with water only in the activated state. Zinc, chrome, iron, titanium, cobalt, nickel, etc. react with water steam at red metal temperature.

Usually, Mg and Al are used in practice, because B, Be, Na, K, Li:
- are comparatively expensive metals,
- their reaction with water proceeds very rapidly, so that it is scarcely or badly controllable.

Activation of magnesium is carried out under addition of a small quantity of alloying elements, such as Fe, Cu, Co, Ni, Mo; as it will be better explained later on, it was found that the best solution lies in using magnesium added with nickel in a percentage not higher than 3%.

Activation of aluminum can be carried out by processing its powder with calomel, potassium cyanide, then amalgamating and adding indium, gallium, tin, etc. to the alloy.

Consumption of activated magnesium is 1.1 kilograms per 1 $m^3$ of hydrogen, and aluminum consumption is 0.9 kilograms per 1 $m^3$ of hydrogen. However, taking into account the mass of alloying additives, which for aluminum reaches 15% in comparison with 1-2% for magnesium, the hydrogen output of above-mentioned alloys is approximately the same. Purity of the obtained hydrogen achieves here 99%.

The hydrogen production through activated metals is not associated to toxic substances and does not require any additional power supply.

The purity of the hydrogen obtained by reaction with water, as well as the high output rates and the comparatively low consumption of basic materials, make the known methods preferred in the applications for autonomous power generation.

Reactions of hydrogen obtained by water dissolution with metals and alloys show a remarkable exothermal character, so that most of the available energy is given in the form of reaction heat.

As a conclusion, hydrogen production with simultaneous heat generation is provided only by the methods based on the reaction between metals/alloys and water. In table 1 some characteristics of hydrogen production methods from water or aqueous solutions with the use of metals are shown.

TABLE 1

Characteristics of methods used to obtain hydrogen from water.

| Method | Unit | Mg + H$_2$O | Al + H$_2$O | Fe + H$_2$O | Si + H$_2$O | FeSi + H$_2$O |
|---|---|---|---|---|---|---|
| Additional components | | NaCl | NaCl | — | Na(OH) | Na(OH) |
| Mass of components for 1 kg of H$_2$ produced | Kg | 30 | 27 | 37 | 31.5 | 30.5 |
| Process temperature | °C. | 70 | 70 | 650-850 | 65-70 | 70 |
| Pressure | Mpa | ≧0.1 | ≧0.1 | 0.1 | ≧0.1 | ≧0.1 |
| Reaction by-products | | Mg(OH)$_2$ | Al(OH)$_3$ | Fe$_2$O$_3$ FeO | SiO$_2$ | Fe(OH)$_3$ SiO$_2$ |
| Toxicity during storage | | no | no | no | toxic | toxic |
| Storage conditions | | No special requirements | | | watertight | watertight |
| Toxicity during production | | no | no | no | toxic | toxic |

From table 1 it appears that the best results for hydrogen production from water can be obtained with the use of magnesium and aluminum alloys.

Among all metals and compounds, which can be used for hydrogen production by water separation, magnesium is comparatively a cheap metal.

Application of aluminum to such propose is difficult, because it requires activation through the addition of expensive agents (indium, gallium, tin) up to 15 mass-%. The advantage in hydrogen generation by aluminum reaction with water as compared with to magnesium is then lost due to the large mass of additive agents. Moreover, problems are encountered in the storage of activated aluminum alloys.

Activated magnesium alloys can be stored for a long time without any need arising for special provisions to be taken in order to isolate them from atmospheric air; as a matter of fact, a layer of magnesium oxide will build up on the surface of nickel-magnesium alloys, which is effective in preventing the whole mass of magnesium from reacting with the air moisture. Therefore, the magnesium-nickel alloy can be stored for long lasting periods without any special care having to be taken.

When correctly packed and stored, magnesium alloys needed for hydrogen generation do not require either much storage space or special storage conditions.

Water for the reaction can be used from any source and does not need any additional cleaning, purification or preparation step.

All considered, the best method to generate both hydrogen and electric energy is the one based on the reaction between water and magnesium-based alloys.

At the current research and development stage, magnesium alloy with just a small amount of nickel (up to 1.5%) as an additive agent is used as the most viable and proven one.

Magnesium reacts badly with water under normal conditions, because of the presence of the above-mentioned MgO film on its surface. However, at temperatures higher than 330K (Kelvin), appreciable hydrogen production from water is observed according to the following reaction:

$$Mg + 2H_2O \rightarrow Mg(OH)_2 + H_2 + Q \quad (1)$$

This reaction is an exothermic one, with the thermal effect Q=353 kJ/mol.

The reaction of 1 kg of magnesium alloy with water gives 0.083 kg of H$_2$ (0.93 m$^3$) and $Q_M$=14400 kJ of heat.

The thermal balance and the amount of magnesium alloy needed for a washing cycle performed with water heated up to 90° C. are given below; the heat of reaction $Q_R$ is distributed as follows:

$$Q_P = Q_{cp} + Q_{BP} + Q_{KOi} + Q_B + Q_{icp} + Q_{BOD} \quad (2)$$

where:
$Q_p$—amount of heat for one washing cycle ($Q_p = Q_M G_{cp}$);
$G_{cp}$—weight of magnesium alloy for one washing cycle.
$Q_{cp}$—amount of heat used for heating the magnesium alloy;
$Q_{Bp}$—amount of heat for heating the water for reaction;
$Q_{KOi}$—amount of heat used to heat up the physical and constructive elements;
$Q_B$—amount of heat used to heat up the washing liquor;
$Q_{icp.}$—heat for the evaporation of water in a reactor;
$Q_{Bod}$—heat for hydrogen heating
$Q_M$—heat for 1 kg of magnesium alloy.

In accordance with equation 1, the weight of the water needed to carry out the reaction is: 1.5 $G_{Mg}$.

Based on experimental data, excess water is needed to both allow for evaporation in the reactor and bind waste products of reaction. The factor accepted for such water excess is 2.

Upon transforming equation 2, $$Q_M G_{CP} = C_P^{cp} G_{CP} \Delta T_1 + 3 C_P^B G_{CP} \Delta T_1 + C_P^{KOi} G_{KOi} \Delta T_2 + C_P^B G_B \Delta T_2 + r_o G_{iCP} + 0.08 C_P^{BOD} G_{cp} \Delta T_2 \quad (3)$$

where in this equation 3:
$C_P^{cp}$, $C_P^B$, $C_P^{KOi}$, $C_P^{BOD}$—are respective specific heat values for magnesium alloy, water, construction material, hydrogen, (kJ/kgK),
$G_{icp}$—weight of water evaporated in the reactor, in kg;
$r_o$—heat of vaporization, (kJ/kgK);
$\Delta T_1$—difference of temperatures between reactor and environment, set at 100° C.;
$\Delta T_2$—difference of temperatures between a cooling outer jacket of the reactor and the environment, set at 70° C.

The estimated weight of construction elements and parts is 10 kg, the weight of heated-up water is equal to 15 kg, the weight of the evaporated water in the reactor is –1.5 kg, and, neglecting the last member of equation 3 as being very low, the weight of the alloy is calculated as follows:

$$G_{cp} = \frac{(C_P^{KOl} G_{KOl} + C_P^B G_B) \Delta T_2 + r_0 G_{icp}}{Q_M - (C_P^{cp} + 3 C_P^B) \Delta T_1} =$$

$$= \frac{(0.48 \times 10 + 4.2 \times 15) \times 70 + 2480 \times 1.5}{14400 - (1.1 + 3 \times 4.2) \times 100} = 0.64 \text{ kg}$$

Thus, the weight of the alloy needed to heat the washing liquor up to 90° C., is 0.65 kg.

A significant portion of the heat output is used to water evaporation purposes in the reactor ($r_o G_{w.ev}$). For these losses to be reduced, the need arises for the pressure in the reactor to be increased up to 0.2-0.3 MPa, which results in the boiling temperature in the reactor being increased to up 120-130° C. This again results in the temperature difference and the losses caused by water evaporation being in turn decreased. The weight of magnesium alloy needed for a washing cycle without losses has been estimated to amount to 0.36 kg. Taking into account the heat losses due to evaporation, which cannot be completely eliminated, the actual weight of the alloy required for carrying out a washing cycle at a temperature of 90° C., will amount to approximately 0.5 kg.

When heating the washing liquor to a lower temperature, the weight of the alloy needed for reaction will be reduced accordingly.

If the alloy is fully used in the reactor, this will generate 0.5 $m^3$ of hydrogen. By using this hydrogen in fuel elements, it is possible to obtain 1 kWh of electric power. It is obvious that there will then be a surplus of electric power, which can however be used to either water heating purposes, thus reducing the weight of magnesium alloy required, or to some other useful purpose, such as in a clothes drying process.

Exhaustive research and experimental work has shown that the reaction rate and, hence, the heat release rate and the water heating effect depend basically on the reaction temperature.

It is possible to influence the rate of reaction in several ways, i.e.:

Constructively, by selecting the proper size and shape of the reactor, along with the size and form of the magnesium, which is best packed in a cartridge for easy and convenient insertion in and removal from the reactor after use.

Physically, by affecting, i.e. varying the conditions of heat exchange both at the reaction site and around the reactor.

Chemically, by affecting, i.e. varying the chemical composition and the mechanical state (dispersiveness) of the alloy.

In the light of the actual operating conditions of autonomous systems, for which variable loadings are typical, it is a common procedure to design hydrogen gas and heat generators based on the principle of the replacement of the chemical reacting charge. The reaction agents, i.e. magnesium and water, which are constantly in a reactionary zone in reactors of the "mixed" type, are on the contrary separated in the reactor of the replacement type. In such reactor, loaded with the necessary amount of magnesium alloy, the reaction rate and, hence, the heat release and hydrogen output depend on the amount of water used in the reaction. It enables the productivity of the generator to be appropriately adjusted and prevents the presence of free water, which could enter into reaction in the reactor volume.

Design of an Autonomous Source of Hydrogen and Heat for a Washing Machine.

A washing machine according to the invention comprises a heat and gas generator, in which the alloy reacts with water, thereby generating a flow of hydrogen gas and releasing heat.

As the reaction is an exothermic one, a remarkable amount of heat (about 14000 kJ from 1 kg of alloy) is generated, which can be used in different ways depending on the machine. Of course, the reaction heat will be spent for heating up the washing liquor. The hydrogen generated in the reaction is in turn used in a fuel cell for electric power generation.

The simplified basic diagram of a heat and gas generator of the above-mentioned kind, as used in a washing machine, is shown in FIG. 1.

The way in which this heat and gas generator works is as follows.

In the first place, the cartridge containing magnesium alloy is inserted in the reactor 1. Water for reaction is filled into the tank 4 (approx. 1.5 l), and water for washing is let into the washing tub of the machine. The pump 15 pumps the water towards the reactor via the opened valve 16. After a short time, as necessary for the components to warm up, reaction starts under hydrogen emission and heat release.

At this point, the pump 27 starts working and pumps water from the washing tub through the cooling jacket of the reactor to cause it to be heated by it. When the water is heated up to a pre-selected temperature, the pumps 15 and 27 are switched off.

The hydrogen generated during the reaction is collected in the upper portion of the reactor 3 and flows via the conduit 6 and the valve 17 to the condenser 10, where its humidity is condensed and removed therefrom. The condenser 10 is also used as a hydro-seal.

Reactor

A number of different magnesium-alloy preparation methods have been investigated. The best results have been obtained when the activated magnesium, in the form of minutely fragmented parts, was packed in cartridges made of punched metal and covered with thin fabric. The basic advantages deriving from loading the alloy in fabric cartridges into reactor are as follows: quicker activation and operation, as well as full retention of the reaction by-products within the cartridge itself.

The use of cartridges for loading the alloy in the reactor accelerates and simplifies the alloy preparation procedure. In such cartridges, owing to the greater contact surface of reaction agents per unit of volume, it is possible for the maximum density of the activated alloy to be increased to values of up to 0.35-0.38 $kg/dm^3$. It offers additional opportunities in view of reducing the size of the reactor and thus allows the specific volumetric characteristics of the reactor and the hydrogen source to be significantly improved.

The volume of a reactor at a density of the magnesium alloy equal to 0.35 $kg/dm^3$ is approx. 1.42 $dm^3$. If the reactor contains one cylindrical cartridge, its overall dimensions will show a diameter of 95 mm, and a length of 200 mm.

In reactors using replaceable cartridges, and in which water is caused to flow through a layer of reaction products (slag), the hydraulic, i.e. flow resistance of reaction products is the critical value for determining the geometrical size thereof. It will in fact determine the size of the conduit for the water used in the reaction and the length of the water distribution means up to periphery of the alloy.

Considering the density of the magnesium alloy, and in order to minimize pressure losses of the water delivered for the reaction, the value of the flow resistance of the slag layer must not be in excess of 10 kPa.

This requirement enables the thickness of the slag layer and, hence, the corresponding thickness of the layer of loaded magnesium alloy to be appropriately determined. For a density of the loaded magnesium alloy of 0.35 $kg/dm^3$, this amounts to 40 mm. Thus, the radius of the cartridge under the described conditions should not exceed 40 mm.

A description of the construction features of the above-illustrated technical solution will at this point follow with reference to FIG. 1. The reservoir indicated at 4 contains an amount of water that is sufficient in view of ensuring the desired reaction with the magnesium loaded in the reactor so as to produce the desired amount of heat along with the desired amount of hydrogen, wherein such amount of water is of approx. 2 liters.

In the course of exhaustive and extended experiments and operation tests it has been found that the activation of the reaction in the reactor is facilitated to a considerable extent if an amount of NaCl is added in a percentage situated anywhere between 1% and 15% to the water contained in the reservoir 4, since such addition is effective in contributing to the elimination of the oxide layer formed on the surface of the magnesium, which would of course strongly oppose the reaction.

As far as the magnesium itself is concerned, it may be processed into minute pieces, such as flakes, fragments, pulverized particles, or the like; the kind of processing is not critical in itself, although it can be most readily appreciated that the smaller the size of the particles, which the magnesium introduced in the reactor is ground to, the easier the way in which it can become most thoroughly exposed to water for reacting therewith.

For the water to be transferred from said reservoir 4 to the reactor 3, said first conduit 5 is provided with a first pump 15 and a first valve 16, the operation of which shall be explained in greater detail further on.

As far as the manner in which gaseous hydrogen is transferred to the fuel cell 2 is concerned, use is made in this case of said second conduit 6, which shall however be duly completed, i.e. integrated by following members and devices: immediately downstream of the reactor, said conduit 6 is in fact provided with a second valve 17, the purpose of which is to keep the hydrogen produced in the reactor 3 under pressure, since the fuel cell 2 that uses said hydrogen is optimized in the operation thereof by feeding it with hydrogen flowing in at a controlled pressure.

Downstream of this second valve 17 there is provided a filter-scrubber 10, which consists of a vessel containing a liquid adapted to capture, i.e. retain and condense reaction by-products and the humidity contained in the stream of hydrogen flowing therethrough. This liquid may be simply water and, of course, the inlet opening leading into said filter-scrubber 10 and the outlet opening therefrom must be arranged so that the inflowing hydrogen is capable of only flowing again into the downstream portion of said conduit 7 upon moving through—under scrubbing conditions—a sufficient volume of filtering water in said filter-scrubber 10.

Downstream of this filter-scrubber 10, the second conduit 7 may then be connected directly to the fuel cell 2; the fact should however be considered that, for the washing machine to be able to start an operating cycle, it is necessary for an initial source of electric power to be available, so that, if this electric power is first generated and supplied during the reaction, i.e. after the machine is started, the latter would be unable to start operating, actually.

Figure 5:
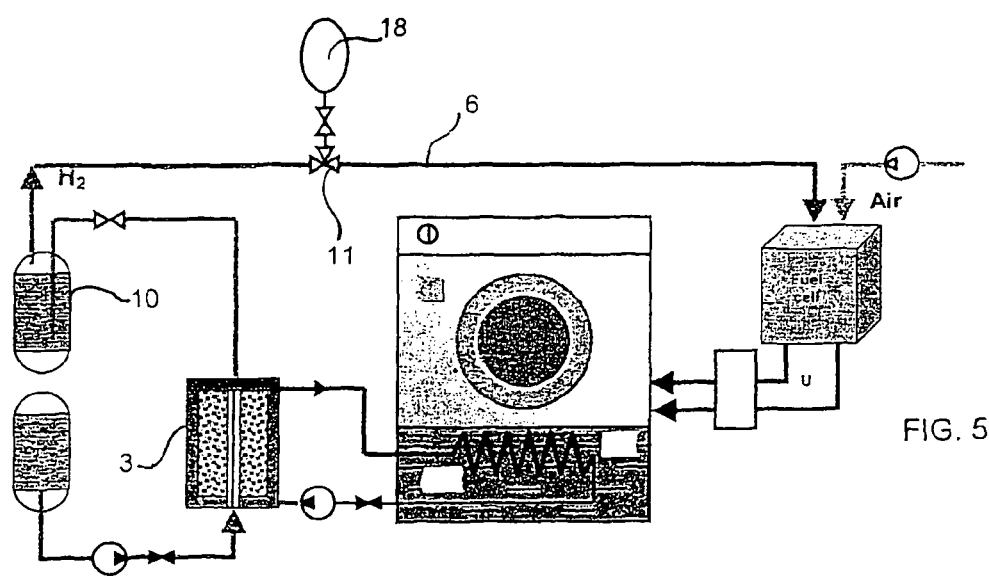
FIG. 5 is a schematical view of a further improved embodiment of the washing machine according to the present invention.

In order to do away with such problem, in the second conduit 6, downstream of said filter-scrubber 10, there is provided a third three-way valve 11, of which a first way opens into said filter-scrubber 10, a second way opens into said fuel cell 2 and a third way opens into a sealed reservoir 18 (see FIG. 5).

The purpose of said sealed reservoir 18 is to store part of the excess gaseous hydrogen that is produced by the reactor 3, and is released under pressure into said conduit 6, in view of giving off again the stored hydrogen gas when the machine is started for operation, so that the fuel cell can be fed before the reactor itself starts operating.

For it to be started, i.e. switched on, the washing machine actually requires just a minimum quantity of electric power that is basically needed to actuate the valves and the control devices of the fuel cell. This minimum amount of electric power may most easily be stored in the machine with the aid of appropriate Powercap capacitors, whose charge is used to start the operation of the machine; conclusively, the power-supply chain should be as follows:

upon actuating the switch-on control, the Powercap capacitor activates the fuel cell and opens the valve 11;

upon the valve 11 having been so opened, the hydrogen contained in the reservoir 18 reaches the fuel cell, which then starts to operate, thereby supplying electric power to energize controls, actuators, and the like, such as in particular controls and devices that activate the reactor 3;

upon the reactor having been so activated, this starts producing and supplying both the stream of gaseous hydrogen flowing to the fuel cell and—in part—also to said reservoir 18, and the heat that is used to heat up the washing liquor.

Figure 3:
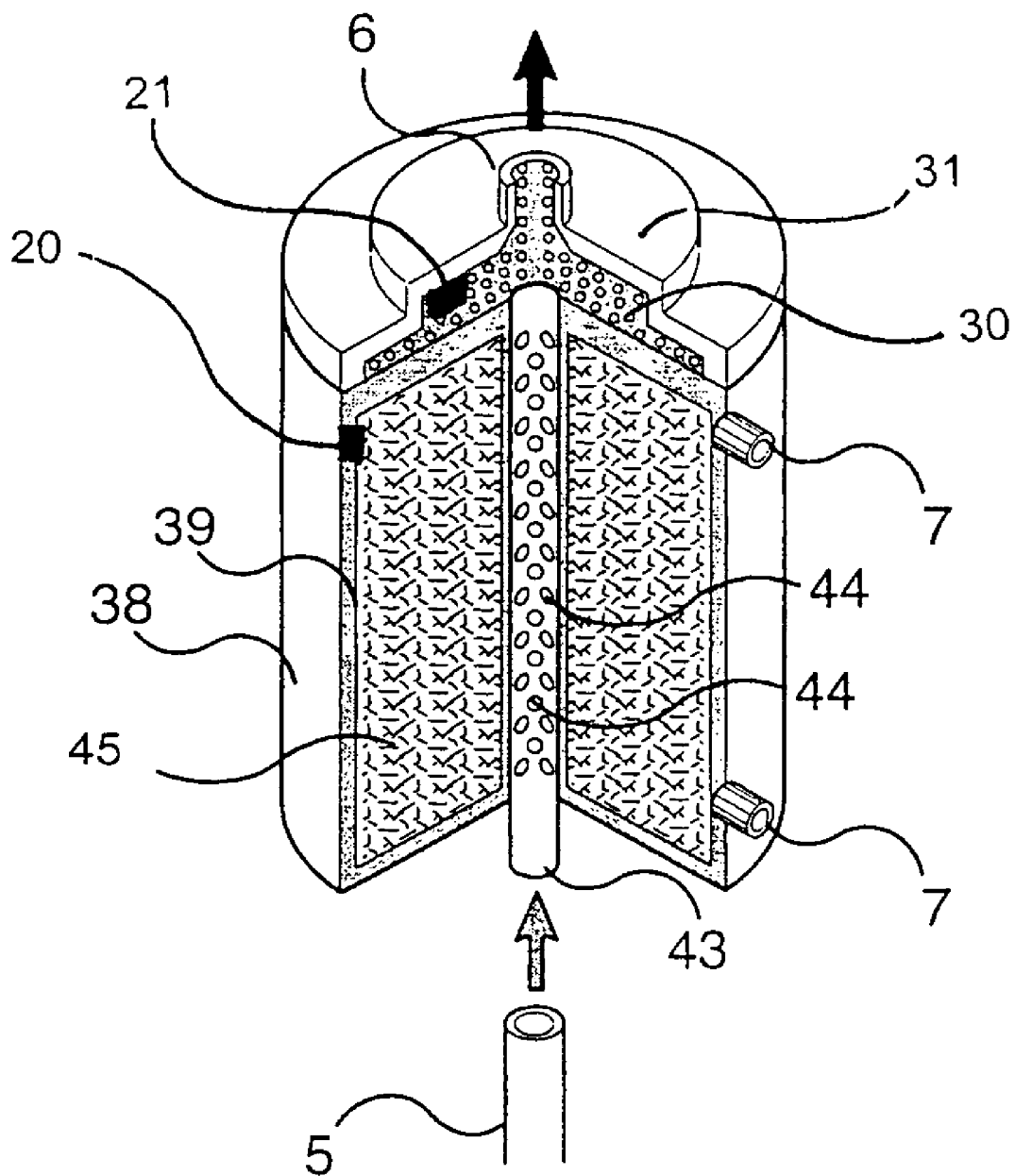
FIG. 3 is a symbolical, partially cross-sectional view of the internal parts of a basic device of the machine according to the present invention.

As best shown in FIG. 3, and as far as the heat generation process and the conveyance of this heat to the washing liquor are concerned, the reactor 3 is symbolically shown to contain a first heat exchanger 8, through which the heat generated within said reactor is transferred into the third conduit 7 and, via this conduit, reaches the washing liquor in a way that shall be explained in greater detail further on.

Figures 4, 4A:
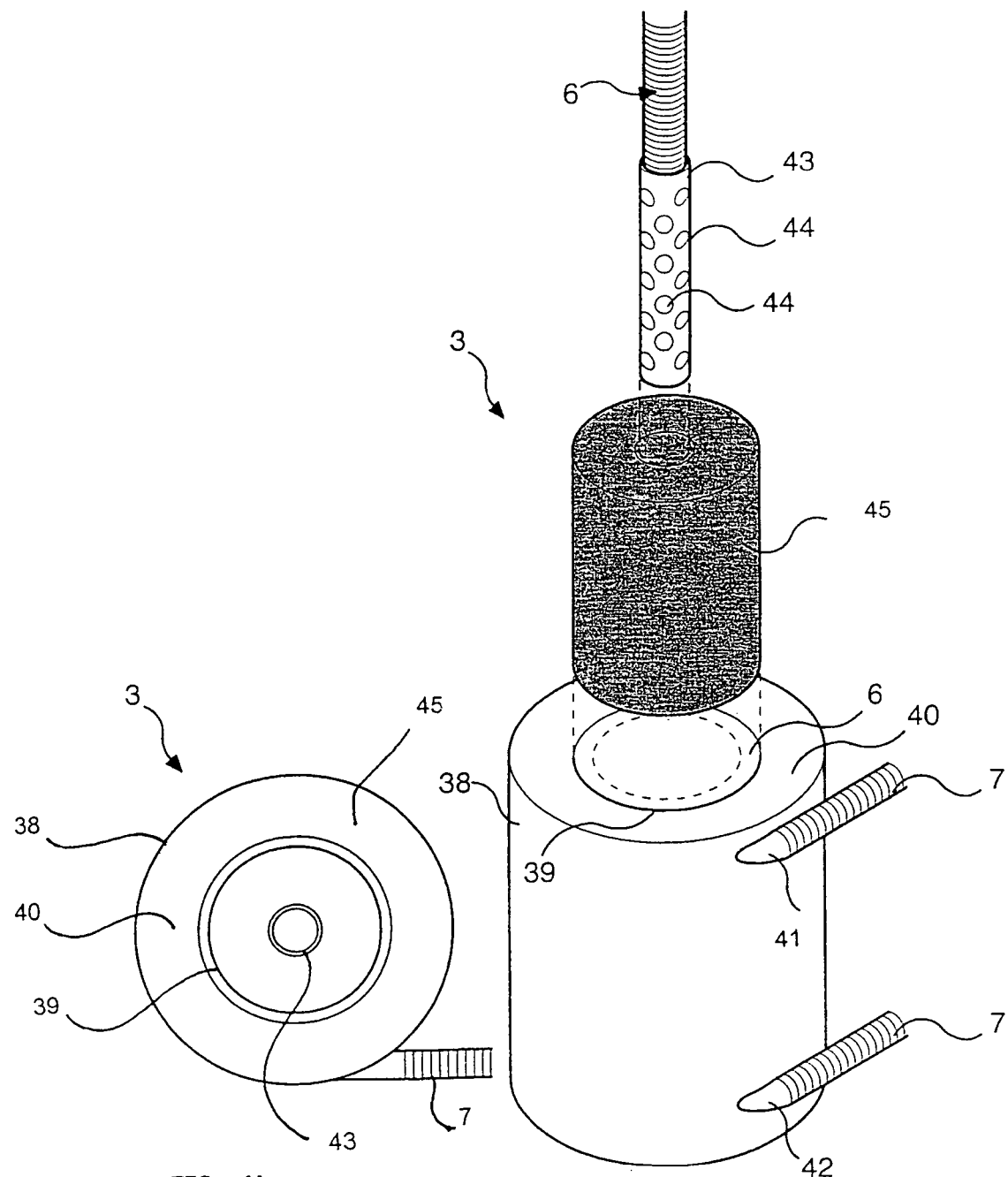
FIG. 4 is an exploded view of the device shown in FIG. 3.
FIG. 4A is a cross-sectional view of the same device shown in FIG. 3.

In particular, a preferred embodiment is illustrated in FIGS. 3 and 4, where it can be noticed that the reactor 3 is provided with an outer cylindrical body 38, inside which there is coaxially arranged an inner cylindrical body 39 that most obviously has a smaller diameter than said outer body.

Between said two cylindrical bodies 38 and 39 there is provided an annular, sealed jacket or hollow space 40 having the same height as said two bodies.

This annular hollow jacket 40 is connected with the outside via two distinct apertures 41 and 42 in the outer surface of the outer body 38, wherein one of these apertures connects with an end of said third conduit 7, while the other one is similarly connected to the opposite end of said conduit.

The magnesium mass to be used in the reaction is placed—in a way that shall be explained in greater detail further on—within said inner body 39. In order to enable this magnesium mass to react, inside said inner cylindrical body 39 there is further arranged an inner channel 43 extending in a substantially coaxial manner with said two cylindrical bodies 38 and 39.

This inner channel 43 is provided with a plurality of through-holes or perforations 44, and it is connected on one side to said first conduit 5 and, on the other side, to said second conduit 6, so that the inner chamber of said inner body 39 is practically connected to both said conduits 5 and 6 via said perforations and said inner channel.

More generally, said third conduit 7 extends further into said annular hollow jacket that is delimited by said inner cylindrical body 39 and comes in this way directly into contact with the inner chamber of the latter, where the reaction between the magnesium and the water takes place under generation of heat and gaseous hydrogen.

To make it more convenient for the magnesium charge to be introduced and removed, use van advantageously be made of a removable cartridge 45 containing the magnesium, wherein such cartridge is adapted to be introduced in the reactor from above through an opening provided with an appropriate re-sealable cover.

In practice, and with particular reference to FIG. 4, a structure in the form of a set of Russian dolls is thereby obtained, in which the outer annular hollow jacket 40, accommodates the removable cartridge 45 thereinside and this cartridge 45 in turn accommodates said inner channel 43, which is however firmly joined or integral with the structure of the reactor 3.

In an advantageous manner, there may also be provided and used so-called "differentiated-charge" cartridges, in the sense that they may contain an amount of magnesium specially metered to heat up the washing liquor to a particular temperature, such as for instance 30° C. or 50° C. or even 70° C., according to the desired type of washing cycle to be performed.

The way in which the whole above-described arrangement works in principle may at this point be more readily understood: upon the removable cartridge 41 containing the magnesium charge having so been introduced and the reactor 3 having been tightly closed again, the first pump 15 is energized and the first valve 16 of the first conduit 5 is opened. Water is thus enabled to flow from the reservoir 4 into the reactor 3 and in particular, by flowing along said inner channel 43 and through said perforations 44, it enters the cartridge, where it comes in contact with the magnesium, thereby triggering the reaction process.

As a result of such reaction, a stream of gaseous hydrogen is developed, which then flows out of the body of said cartridge, preferably from the upper side thereof, to collect into the bell-shaped portion 30 into which the upper cover 31 of the reactor is formed, and which is arranged to connect with and lead into said second conduit 6 and, via said conduit, the fuel cell. At the same time, the heat generated by said reaction transfers by simple conduction effect to said inner cylindrical body 39 and, from this body, to said annular hollow jacket 40, through which the liquor to be heated up is caused to flow.

From this annular hollow jacket 40, the heated-up liquor flows again into the third conduit 7, which is provided with an appropriate second pump 27 to circulate said liquor from the washing tub of the machine to said annular hollow jacket and, from the latter, again to the washing tub of the machine, according to operating modes that will of course be inherently included in the general program control scheme of the machine.

It will of course be appreciated that the above description has only been given to the purpose of setting forth the general criteria and principles of embodiment of the present invention, since the actual modes of embodiment and operation will be able to most easily and readily be defined and set precisely in the design stage of the washing machine.

However, it is considered fully appropriate to give here some particularly useful information concerning the operation of a washing machine provided with an arrangement according to the present invention.

A first such information covers a major safety aspect: it may in fact be most readily appreciated that if for any reason whatsoever the reaction process in the reactor goes out of control, i.e. becomes uncontrolled, the risk is incurred of a destruction of the same reactor, or, in the worst case, of an explosion.

With reference to FIG. 3, and in view of doing away with such kind of problem, a thermometer 20 and a pressure switch 21, adapted to measure the related parameters and to send the corresponding signals to the control and actuation devices of the machine, are advantageously arranged close to the inner chamber of the reactor, wherein said control and actuation devices of the machine are appropriately set and programmed so that—whenever said measurements are detected to be in excess of respective pre-set maximum allowable values—the reaction is immediately and automatically stopped, e.g. by causing the first valve 16 to close and/or the second valve 17 to open.

Figure 6:
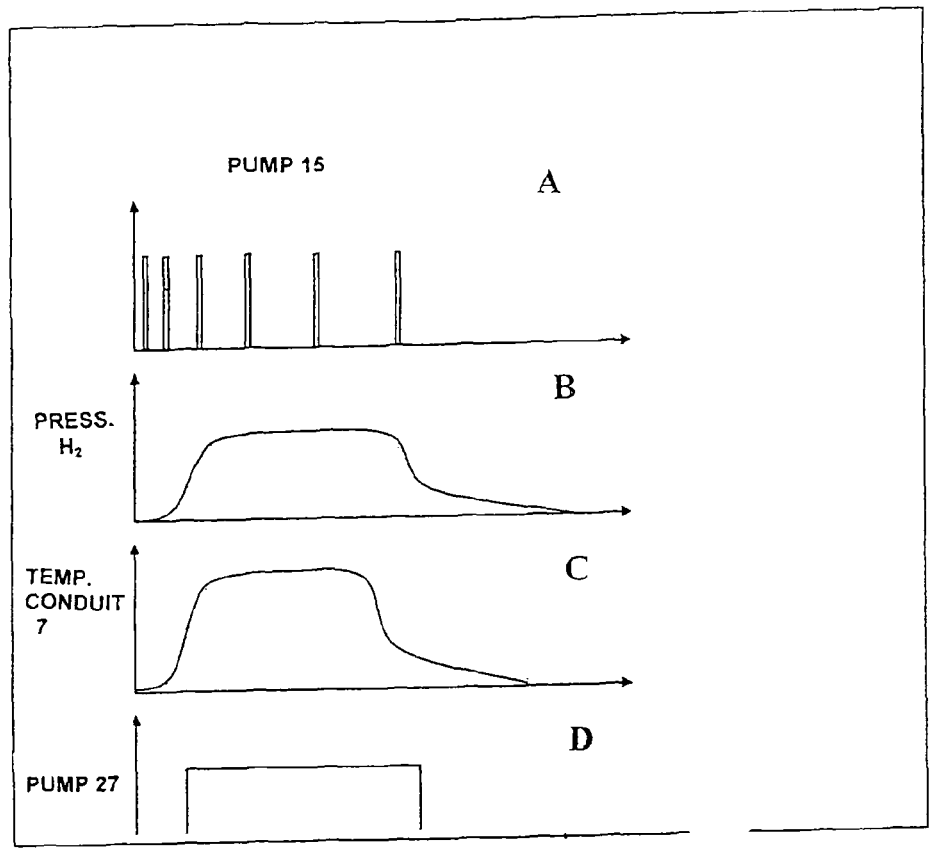
FIG. 6 is a diagrammatical view of graphs (A, B, C and D) showing some temporal correlations of respective operating modes of a machine according to the present invention.

It should further be noticed that, for the reactor to operate correctly, i.e. in order to prevent the hydrogen pressure from stopping the water inflow from the reservoir 4, the first valve 16 and the first pump 15 are only actuated, i.e. operated for short time intervals, as this is symbolically shown by the graph "A" in FIG. 6. In fact, this measure is effective in enabling just small amounts of water to only be let into the reactor in the phases in which the reaction is dying out, i.e. becoming extinct, so that it generates a quite limited counter-pressure that does not oppose or impair the inflow of new water for the reaction process, and—as a result—the phases of most intensive reaction, i.e. highest counter-pressure, to only take place when said valve and said pump are closed and switched off, respectively, thereby avoiding any problem connected with water and gas flowing back into the reservoir 4.

A further advantageous improvement can be obtained by providing the second conduit 6 with a second valve 17 adapted to be controlled from the outside.

This valve enables the pressure of the gas being produced to be adjusted, so that this gas can only be delivered to both the fuel cell 2 and the reservoir 18 at the desired optimum pressure thereof.

Figure 2:
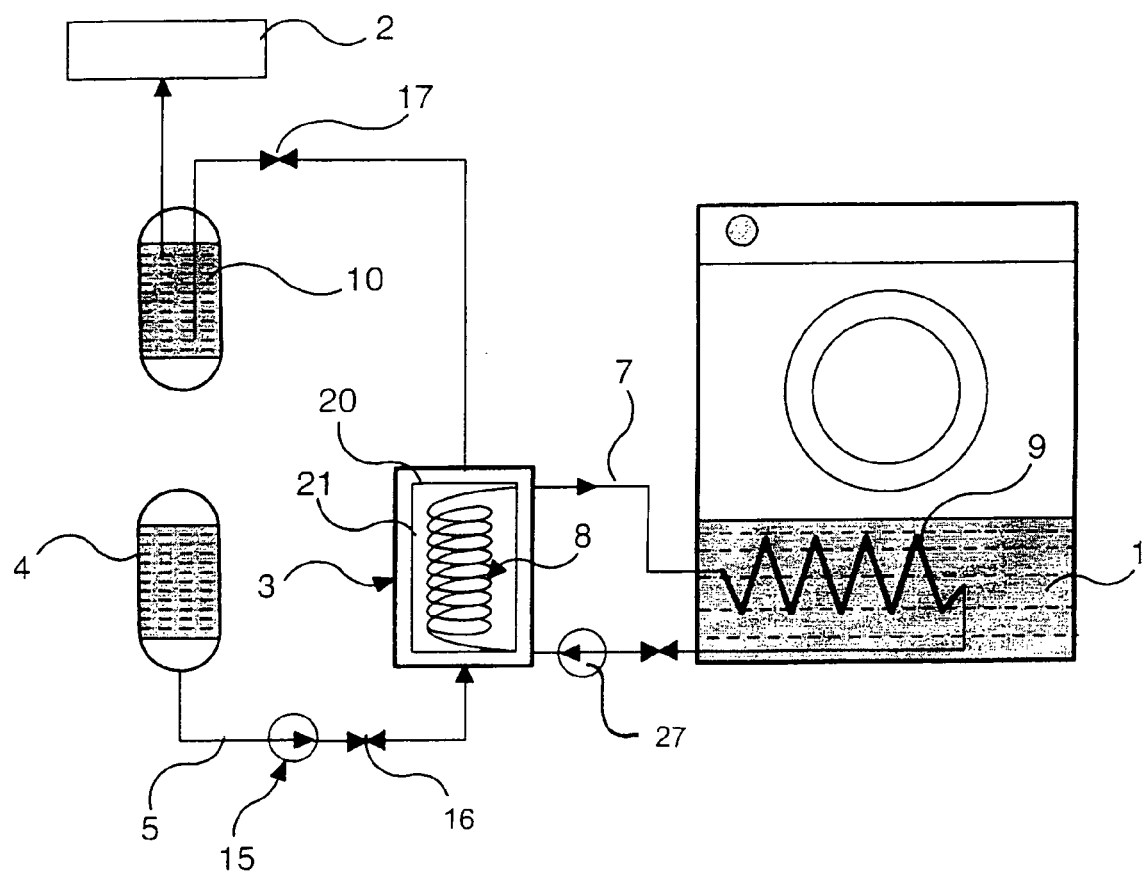
FIG. 2 is a view of an improved embodiment of the washing machine illustrated in FIG. 1.

A further drawback that is likely to be encountered arises from the fact that the washing liquor may happen to contain such quantity of contaminants and foreign matters as to cause said annular hollow jacket 40 to become gradually obstructed. So, in view of warding off this risk, and with reference to FIG. 2, another advantageous improvement may be obtained by providing second heat-exchange means 9 between said third conduit 7 and said washing liquor in the tub of the washing machine; in practice, this would create a second heat exchanger towards the washing liquor, i.e. the washing tub of the machine, so as to completely isolate the reactor from the washing liquor itself.

With reference to FIG. 6, this can be noticed to further represent some graphs illustrating the course, i.e. trend pattern of some machine parameters on the same time scale; as already mentioned, the graph "A" in the Figure represents a sequence of short time intervals, each one of which lasts just a few seconds, and during which both the first pump 15 and the first valve 16 are activated to let correspondingly small quantities of water into the reactor.

At the same time, the graph "D" in the same Figure shows that the second pump 27 in the third conduit 7 is activated, i.e. operated in a continuous manner to enable liquor to continuously and regularly circulate in the related circuit.

Concurrently with the above-mentioned graphs, the graph "B" and the graph "C" show—in a fully qualitative manner—a typical course of the pressure of the gaseous hydrogen within the reactor 3 and the temperature of the liquor inside the third conduit 7, respectively.

The invention claimed is:
1. Machine for washing items of various kind comprising:
a stationary washing tub (1) intended to contain the washing liquor,
a fuel cell (2) that receives a stream of gaseous hydrogen and converts said stream into a source of electric power,
means for generating said stream of gaseous hydrogen and transferring said stream to said fuel cell (2),
an electric connector that transfers the electric power generated in said fuel cell to a control and actuation device comprised in said washing machine,
wherein said means for generating said stream of gaseous hydrogen comprises:
a sealed reactor (3), in the interior of which there is placed a mass of metal substances,
a water source,
a first conduit (5) to convey water from said water source to said sealed reactor,
a second conduit (6) to convey a flow of gaseous hydrogen from said sealed reactor to said fuel cell, a third conduit (7) to convey the water from said sealed reactor (3) to said washing tub, said sealed reactor (3) comprising a first heat exchanger (8) that transfers heat generated inside said sealed reactor to a heating liquid circulating in said third conduit (7), wherein said third conduit (7) connects an interior volume of said reactor (3) with said tub (1) of the washing machine containing the washing liquor, and in said third conduit (7) said heating liquid circulates in a closed-loop pattern.

2. Washing machine according to claim 1, wherein said metal substances comprise magnesium.

3. Washing machine according claim 2, wherein said water source comprises a reservoir (4), and that said first conduit (5) comprises a first pump (15) and a first valve (16).

4. Machine according to claim 2, wherein said second conduit (6) comprises a second valve (17).

5. Machine according to claim 4, wherein a humidity condenser (10) is arranged in said second conduit (6) downstream of said second valve (17).

6. Machine according to claim 5, wherein in said second conduit (6), downstream of said humidity condenser (10), there is arranged a third valve.

7. Machine according to claim 6, wherein said third valve (11) is a three-way valve, and a third way of said three-way valve leads to a sealed reservoir (18) for containing and storing the excess gaseous hydrogen flowing in form said humidity condenser (10).

8. Machine according to claim 2, wherein said magnesium is associated to a quantity of nickel.

9. Machine according to claim 8, wherein said nickel is associated to said magnesium to a percentage that is not higher than 3% by mass.

10. Machine according to claim 1, wherein a second pump (27) is installed in said third conduit.

11. Machine according to claim 1, further comprising a second heat exchanger (9) that transfers the heat from said heating liquid flowing through said third conduit to said washing liquor.

12. Machine according to claim 1, wherein said sealed reactor (3) comprises an outer body (38) and an inner body (39), which define a first sealed annular hollow jacket (40) therebetween, which is connected with the outside via two distinct apertures (41, 42), two respective ends of said third conduit (7) being coupled thereto.

13. Machine according to claim 12, further comprising an inner channel (43) arranged within said inner cylindrical body (39), said cylindrical body (39) being coupled at the opposite ends thereof to said first conduit (5) and said second conduit (6), respectively, said inner channel (43) being provided with a plurality of through-holes or perforations (44) opening into said annular hollow jacket.

14. Machine according to claim 13, wherein between said inner cylindrical body (39) and said inner channel (43) there is provided a second annular hollow jacket, in which there is removably received a cartridge (45).

15. Machine according to claim 14, characterized in that said cartridge (45) contains a mass of magnesium formed of minute fragments, flakes or powder.

16. Machine according to claim 1, wherein said reactor (3) comprises at least a temperature sensor (20) and/or a pressure sensor (21).

* * * * *